US012579573B2

(12) United States Patent
Sundaram et al.

(10) Patent No.: US 12,579,573 B2
(45) Date of Patent: *Mar. 17, 2026

(54) SINGLE SIGN-ON THROUGH CUSTOMER AUTHENTICATION SYSTEMS

(71) Applicant: Capital One Services, LLC, McLean, VA (US)

(72) Inventors: Dinesh Sundaram, Plano, TX (US); Jacob Creech, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,629

(22) Filed: May 1, 2023

(65) Prior Publication Data

US 2023/0267414 A1 Aug. 24, 2023

Related U.S. Application Data

(63) Continuation of application No. 16/881,896, filed on May 22, 2020, now Pat. No. 11,669,805.

(Continued)

(51) Int. Cl.
*H04L 67/01* (2022.01)
*G06F 9/445* (2018.01)
(Continued)

(52) U.S. Cl.
CPC ......... *G06Q 10/10* (2013.01); *G06F 9/44505* (2013.01); *G06F 9/54* (2013.01);
(Continued)

(58) Field of Classification Search
CPC .............. G06F 16/258; G06F 16/9558; G06F 16/9562; G06F 21/53; G06F 21/602;
(Continued)

(56) References Cited

U.S. PATENT DOCUMENTS 6,029,149 A 2/2000 Dykstra et al.
6,208,979 B1 3/2001 Sinclair
(Continued)

FOREIGN PATENT DOCUMENTS

EP 3723341 A1 * 10/2020 ............. G06F 21/41
WO WO-2009129753 A1 * 10/2009 ......... H04L 63/0815
WO 2015136503 A1 9/2015

OTHER PUBLICATIONS

OASIS. "Security Assertion Markup Language (SAML) V2.0 Technical Overview", Sep. 2005. (Year: 2005).*

(Continued)

*Primary Examiner* — Michael Simitoski
(74) *Attorney, Agent, or Firm* — Sterne, Kessler, Goldstein & Fox P.L.L.C.

(57) ABSTRACT

Described herein is a system, method, and non-transitory computer readable medium related to a service provider using a third party identity provider to authenticate a user with improved security. An authentication token is received from the identity provider, and can be verified against internal configuration information. The internal configuration information includes data that is not included in the authentication token, and therefore, is not vulnerable to some security attacks, such as a man-in-the-middle attack. After the authentication token is verified, the internal configuration information and authentication token may be used to create a custom identifier, referred to as an identity ID. The identity ID may be used by the service provider to verify user access to resources.

18 Claims, 4 Drawing Sheets

Related U.S. Application Data

(60) Provisional application No. 62/852,202, filed on May 23, 2019.

(51) Int. Cl.

| | |
|---|---|
| *G06F 9/54* | (2006.01) |
| *G06F 16/25* | (2019.01) |
| *G06F 16/955* | (2019.01) |
| *G06F 18/24* | (2023.01) |
| *G06F 21/53* | (2013.01) |
| *G06F 21/60* | (2013.01) |
| *G06F 21/62* | (2013.01) |
| *G06F 40/103* | (2020.01) |
| *G06F 40/174* | (2020.01) |
| *G06F 40/18* | (2020.01) |
| *G06N 3/02* | (2006.01) |
| *G06N 5/025* | (2023.01) |
| *G06N 20/00* | (2019.01) |
| *G06Q 10/10* | (2023.01) |
| *G06Q 20/38* | (2012.01) |
| *G06Q 20/40* | (2012.01) |
| *G06Q 30/018* | (2023.01) |
| *G06Q 30/0201* | (2023.01) |
| *G06Q 30/0601* | (2023.01) |
| *G06Q 40/02* | (2023.01) |
| *G06Q 40/03* | (2023.01) |
| *H04L 9/08* | (2006.01) |
| *H04L 9/40* | (2022.01) |
| *G06F 8/65* | (2018.01) |
| *G06F 8/71* | (2018.01) |
| *G06K 7/14* | (2006.01) |
| *G06Q 50/26* | (2024.01) |

(52) U.S. Cl.

CPC ............ *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01); *G06F 21/602* (2013.01); *G06F 21/604* (2013.01); *G06F 21/6227* (2013.01); *G06F 21/6245* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/01* (2022.05); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(58) Field of Classification Search

CPC .. G06F 21/604; G06F 21/606; G06F 21/6209; G06F 21/6227; G06F 21/6245; G06F 2221/2107; G06F 40/103; G06F 40/174; G06F 40/18; G06F 8/65; G06F 8/71; G06F 9/44505; G06F 9/54; G06F 9/547; H04L 63/0428; H04L 63/0435; H04L 63/0442; H04L 63/0471; H04L 63/0478; H04L 63/08; H04L 63/0815; H04L 63/102; H04L 63/123; H04L 63/166; H04L 63/168; H04L 67/01; H04L 9/0822; H04L 9/0825; H04L 9/0894

See application file for complete search history.

(56) References Cited

U.S. PATENT DOCUMENTS

| | | | |
|---|---|---|---|
| 7,107,241 B1 | 9/2006 | Pinto | |
| 7,860,767 B1 | 12/2010 | Vinci et al. | |
| 8,099,605 B1 | 1/2012 | Billsröm et al. | |
| 8,666,885 B1 | 3/2014 | Bramlage et al. | |
| 8,924,720 B2 | 12/2014 | Raghuram et al. | |
| 9,137,228 B1 | 9/2015 | Newstadt | |
| 9,203,829 B1 * | 12/2015 | Levine | G06F 21/41 |
| 9,646,172 B1 | 5/2017 | Jahn et al. | |
| 9,762,616 B2 | 9/2017 | Nagaratnam et al. | |
| 9,774,586 B1 * | 9/2017 | Roche | H04L 63/08 |
| 9,965,911 B2 | 5/2018 | Wishne | |
| 9,992,186 B1 * | 6/2018 | Drozd | H04L 63/102 |
| 10,033,702 B2 | 7/2018 | Ford et al. | |
| 10,044,723 B1 * | 8/2018 | Fischer | H04L 63/102 |
| 10,171,457 B2 | 1/2019 | Moore et al. | |
| 10,243,945 B1 | 3/2019 | Kruse et al. | |
| 11,489,675 B1 * | 11/2022 | Makarskyy | H04L 63/061 |
| 11,669,805 B2 | 6/2023 | Sundaram et al. | |
| 11,676,102 B2 | 6/2023 | Sundaram | |
| 11,676,103 B2 | 6/2023 | Jones | |
| 11,797,932 B2 | 10/2023 | Sundaram et al. | |
| 11,915,196 B2 | 2/2024 | Sundaram et al. | |
| 11,972,020 B2 | 4/2024 | Jones | |
| 12,001,586 B2 | 6/2024 | Sundaram | |
| 2002/0023051 A1 | 2/2002 | Kunzle et al. | |
| 2002/0033838 A1 | 3/2002 | Krueger et al. | |
| 2002/0040339 A1 | 4/2002 | Dhar et al. | |
| 2002/0067907 A1 | 6/2002 | Ameres | |
| 2002/0091629 A1 | 7/2002 | Danpour | |
| 2003/0036993 A1 | 2/2003 | Parthasarathy | |
| 2003/0149781 A1 * | 8/2003 | Yared | H04L 63/0815 709/228 |
| 2005/0086176 A1 | 4/2005 | Dahlgren et al. | |
| 2005/0203834 A1 | 9/2005 | Prieston | |
| 2005/0289341 A1 * | 12/2005 | Ritola | H04L 63/0815 713/168 |
| 2006/0178983 A1 | 8/2006 | Nice et al. | |
| 2007/0061248 A1 | 3/2007 | Shavit et al. | |
| 2007/0250718 A1 | 10/2007 | Lee et al. | |
| 2008/0021997 A1 * | 1/2008 | Hinton | H04L 63/0815 709/225 |
| 2008/0092240 A1 | 4/2008 | Sitrick et al. | |
| 2009/0064107 A1 * | 3/2009 | Chan | H04L 63/0815 717/120 |
| 2009/0300474 A1 | 12/2009 | Asplund et al. | |
| 2009/0327196 A1 | 12/2009 | Studer et al. | |
| 2010/0011421 A1 * | 1/2010 | Chari | G06F 21/31 726/5 |
| 2010/0211780 A1 * | 8/2010 | Mukkara | H04L 63/1466 713/168 |
| 2011/0035794 A1 * | 2/2011 | Wang | G06Q 20/40 726/9 |
| 2011/0307938 A1 * | 12/2011 | Reeves, Jr. | H04L 63/1483 726/3 |
| 2012/0017008 A1 | 1/2012 | Twitchell, Jr. | |
| 2012/0017085 A1 | 1/2012 | Carter et al. | |
| 2012/0210126 A1 | 8/2012 | Johnson et al. | |
| 2012/0246061 A1 | 9/2012 | Ericksen | |
| 2012/0254957 A1 * | 10/2012 | Fork | H04L 63/083 726/6 |
| 2013/0191629 A1 | 7/2013 | Treinen et al. | |
| 2014/0006048 A1 | 1/2014 | Liberty | |
| 2014/0007198 A1 * | 1/2014 | Durbha | H04L 63/102 726/4 |

(56) References Cited

U.S. PATENT DOCUMENTS

| | | | |
|---|---|---|---|
| 2014/0101679 A1* | 4/2014 | Yin ..................... H04N 21/6334 | |
| | | | 725/5 |
| 2014/0189123 A1 | 7/2014 | Dodd et al. | |
| 2014/0207571 A1 | 7/2014 | Hammock et al. | |
| 2014/0237236 A1 | 8/2014 | Kalinichenko et al. | |
| 2014/0304170 A1 | 10/2014 | Spotanski et al. | |
| 2015/0026038 A1 | 1/2015 | Alsbrooks | |
| 2015/0074407 A1 | 3/2015 | Palmeri et al. | |
| 2015/0161364 A1 | 6/2015 | Makarov et al. | |
| 2015/0347770 A1 | 12/2015 | Whalley et al. | |
| 2015/0356314 A1 | 12/2015 | Kumar et al. | |
| 2016/0142408 A1* | 5/2016 | Raepple .............. H04L 63/0807 | |
| | | | 726/9 |
| 2016/0142409 A1* | 5/2016 | Frei .......................... G06F 21/33 | |
| | | | 713/176 |
| 2016/0366122 A1* | 12/2016 | Rykowski ............... G06F 21/41 | |
| 2017/0012965 A1* | 1/2017 | Hurst .................. H04L 63/0892 | |
| 2017/0091231 A1 | 3/2017 | DiFranco et al. | |
| 2017/0099280 A1* | 4/2017 | Goel ...................... H04L 67/146 | |
| 2017/0126661 A1* | 5/2017 | Brannon ............ H04L 63/0815 | |
| 2017/0244695 A1 | 8/2017 | Lund et al. | |
| 2018/0053253 A1 | 2/2018 | Gokhale et al. | |
| 2018/0083931 A1 | 3/2018 | Baig et al. | |
| 2018/0108105 A1 | 4/2018 | Duesterwald et al. | |
| 2018/0158139 A1 | 6/2018 | Krajicek et al. | |
| 2018/0205647 A1* | 7/2018 | Ellis ........................ H04L 45/64 | |
| 2018/0218121 A1 | 8/2018 | Gassner et al. | |
| 2018/0218159 A1 | 8/2018 | Smith, III et al. | |
| 2018/0260576 A1 | 9/2018 | Miguel | |
| 2018/0332016 A1 | 11/2018 | Pandey et al. | |
| 2019/0104123 A1* | 4/2019 | Singh ...................... G06F 21/33 | |
| 2019/0238321 A1 | 8/2019 | Park et al. | |
| 2019/0319946 A1* | 10/2019 | Fan ........................ H04L 9/3213 | |
| 2020/0007531 A1* | 1/2020 | Koottayi ............... H04L 67/146 | |
| 2020/0067907 A1 | 2/2020 | Avetisov et al. | |
| 2020/0099675 A1* | 3/2020 | Mardiks Rappaport ..................... | |
| | | | H04L 63/1466 |
| 2020/0153814 A1 | 5/2020 | Smolny et al. | |
| 2020/0162268 A1* | 5/2020 | Wentz ................... H04L 9/3239 | |
| 2020/0372160 A1 | 11/2020 | Sundaram et al. | |
| 2020/0372169 A1 | 11/2020 | Sundaram | |
| 2020/0372175 A1 | 11/2020 | Sundaram et al. | |
| 2020/0372211 A1 | 11/2020 | Sundaram et al. | |
| 2020/0374273 A1 | 11/2020 | Jones | |
| 2020/0374278 A1 | 11/2020 | Sundaram et al. | |
| 2021/0004479 A1 | 1/2021 | Ithal et al. | |
| 2021/0126910 A1* | 4/2021 | Chauhan ............. H04L 63/0428 | |
| 2021/0336946 A1* | 10/2021 | Cheng ..................... H04L 67/10 | |
| 2023/0267415 A1 | 8/2023 | Sundaram | |
| 2023/0334424 A1 | 10/2023 | Jones | |

OTHER PUBLICATIONS

N. Naik and P. Jenkins, "Securing digital identities in the cloud by selecting an apposite Federated Identity Management from SAML, OAuth and OpenID Connect," 2017 11th International Conference on Research Challenges in Information Science (RCIS), Brighton, UK, 2017, pp. 163-174, 2017. (Year: 2017).*

Genesys. "Single Sign-On Identity Providers", Feb. 2020. (Year: 2020).*

Lindqvist, Carolina. "Authenticating users through a Security Token Service", 2013. (Year: 2013).*

NPL Search (Google Scholar) (Year: 2020).

Bluttman, Ken, Using the Excel IF Function: Testing on One Condition, published Mar. 22, 2019 (available at https://www. dummies.com/article/technology/software/microsoft-products/excel/ using-the-excel-if-function-testing-on-one-condition-259894/) (Year: 2019).

Cheusheva, "Excel IF function: nested IF formulas with multiple conditions, IFERROR, IFNA and more," Apr. 27, 2017 (available at https://web.archive.org/web/2017042003514 7 /https://www.ablebits. com/office-addi ns-blog/2014/12/03/excel-if-function-iferrror-ifna/) (Year: 2017).

Cheusheva, Using IF function in Excel: formula examples for numbers, text, dates, blank cells, Apr. 27, 2017 (available at https://web.archive.org/web/20170420035257 /https://www.ablebits. com/office-addins-blog/2014/11 /26/if-function-excel/) (Year: 2017).

N. Naik and P. Jenkins, "Securing digital identities in the cloud by selecting an apposite Federated Identity Management from SAML , OAuth and OpenID Connect," 2017 11th International Conference on Research Challenges in Information Science (RCIS), Brighton, UK, 2017, pp. 163-174. (Year: 2017).

NPL Search—Google Scholar (Year: 2023).

NPL Search History (Year: 2024), 1 page.

* cited by examiner

300

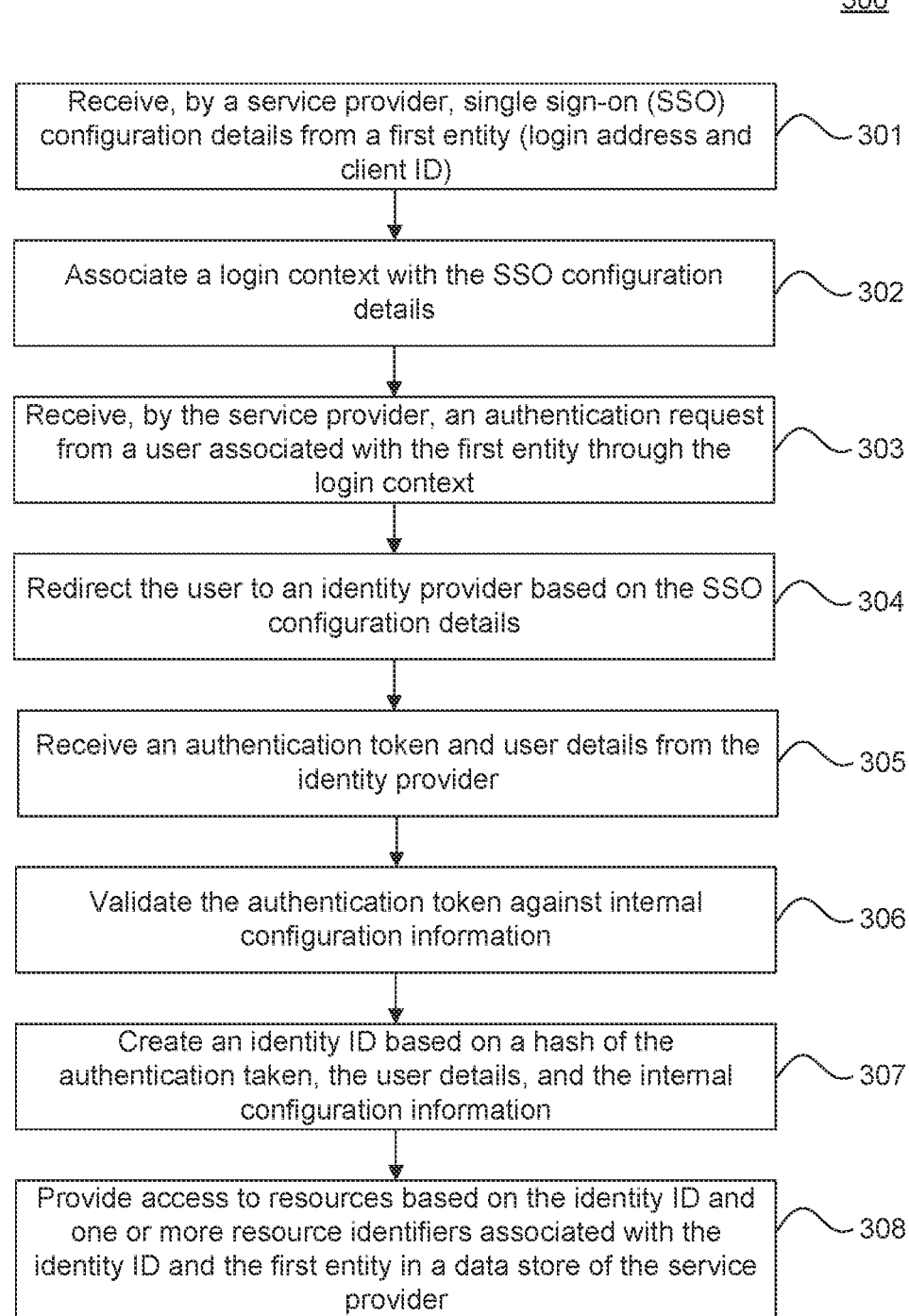

Receive, by a service provider, single sign-on (SSO) configuration details from a first entity (login address and client ID) ～301

Associate a login context with the SSO configuration details ～302

Receive, by the service provider, an authentication request from a user associated with the first entity through the login context ～303

Redirect the user to an identity provider based on the SSO configuration details ～304

Receive an authentication token and user details from the identity provider ～305

Validate the authentication token against internal configuration information ～306

Create an identity ID based on a hash of the authentication taken, the user details, and the internal configuration information ～307

Provide access to resources based on the identity ID and one or more resource identifiers associated with the identity ID and the first entity in a data store of the service provider ～308

FIG. 3

SINGLE SIGN-ON THROUGH CUSTOMER AUTHENTICATION SYSTEMS

CROSS-REFERENCE TO RELATED APPLICATIONS AND INCORPORATION BY REFERENCE

This application is a continuation of U.S. application Ser. No. 16/881,896, filed May 22, 2020 entitled "Single Sign-On Through Customer Authentication Systems," which claims the benefit of U.S. Provisional Application 62/852,202, filed May 23, 2019, entitled "Multi-Lender Platform" which is incorporated herein by reference in their entirety.

BACKGROUND

When a web user wants to use a new web service, they often must create an account with the new web service. As users employ a greater number of web services, keeping track of all the accounts can become burdensome. Having a large number of accounts can also create a security risk, as passwords may be reused. One way to address this issue is to shift identification and authentication to an identity provider, such as another widely-used web service. Facebook and Twitter are two examples of widely-used web services that can act as an identity provider, on behalf of their users, for web services. This allows users of Facebook or Twitter to login to other web services using their Facebook or Twitter credentials. However, using an identity provider for authentication is not, by itself, completely secure, and is not suitable for certain online activities, such as banking, without taking additional security measures. Thus there is a need for improved security when using an identity provider for identification and authentication.

BRIEF SUMMARY

A method of authentication comprises receiving, at a service provider, an authentication request from a user, wherein the user is a member of an entity. The method further comprises redirecting the user to an identity provider, receiving an authentication token and user details from the identity provider, and validating the authentication token against internal configuration information of the service provider. The internal configuration information may include information corresponding to information included in one or more of the authentication token and the user details, and information absent from both the authentication token and the user details. The method further comprises creating an identity ID using the authentication token, the user details, and the internal configuration information, and providing access to resources based on the identity ID.

The method may further comprise receiving, at the service provider, a login address and a client ID, from the entity, and associating a login context with the login address and the client ID.

The method may further comprise receiving the authentication request through the login context, identifying the login address and client ID based on the login context, and redirecting the user to the identity provider based on the login address and the client ID associated with the login context.

The authentication token may comprise an identity provider identifier, a user identifier, and an entity identifier. The validating may comprise verifying that the user identifier is associated with the entity in the internal configuration information.

The creating of the identity ID may comprise performing a hash using inputs comprising: the authentication token, the user details, and the internal configuration information.

The authentication token may comprise an entity identifier, and the internal configuration information may comprise an entity name that is different from the entity identifier. The user details may comprise an account identifier.

The providing access to resources may comprise storing the identity ID, an entity identifier corresponding to the entity, and a resource identifier in a data store. The providing access to resources may further comprise receiving, from the user, a request for a resource corresponding to the resource identifier, determining that the resource identifier is associated, in the data store, with the entity, determining that the user is associated, in the data store, with the entity, verifying, in the data store, that the user is granted access to the resource corresponding to the resource identifier, and providing, to the user, access to the resource corresponding to the resource identifier.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

FIG. 3 is a flow chart illustrating a method of authentication through an identity provider according to some embodiments disclosed herein.

In the drawings, like reference numbers generally indicate identical or similar elements. Additionally, generally, the left-most digit(s) of a reference number identifies the drawing in which the reference number first appears.

DETAILED DESCRIPTION

The embodiments disclosed herein relate to a service provider using a third party identity provider to authenticate a user with improved security. In general, an authentication token is received from the identity provider, and can be verified against internal configuration information. The internal configuration information includes data that is not included in the authentication token, and therefore, is not vulnerable to some security attacks, such as a man-in-the-middle attack. After the authentication token is verified, the internal configuration information and authentication token may be used to create a custom identifier, referred to as an identity ID. The identity ID may be used by the service provider to verify user access to resources.

Figure 1:
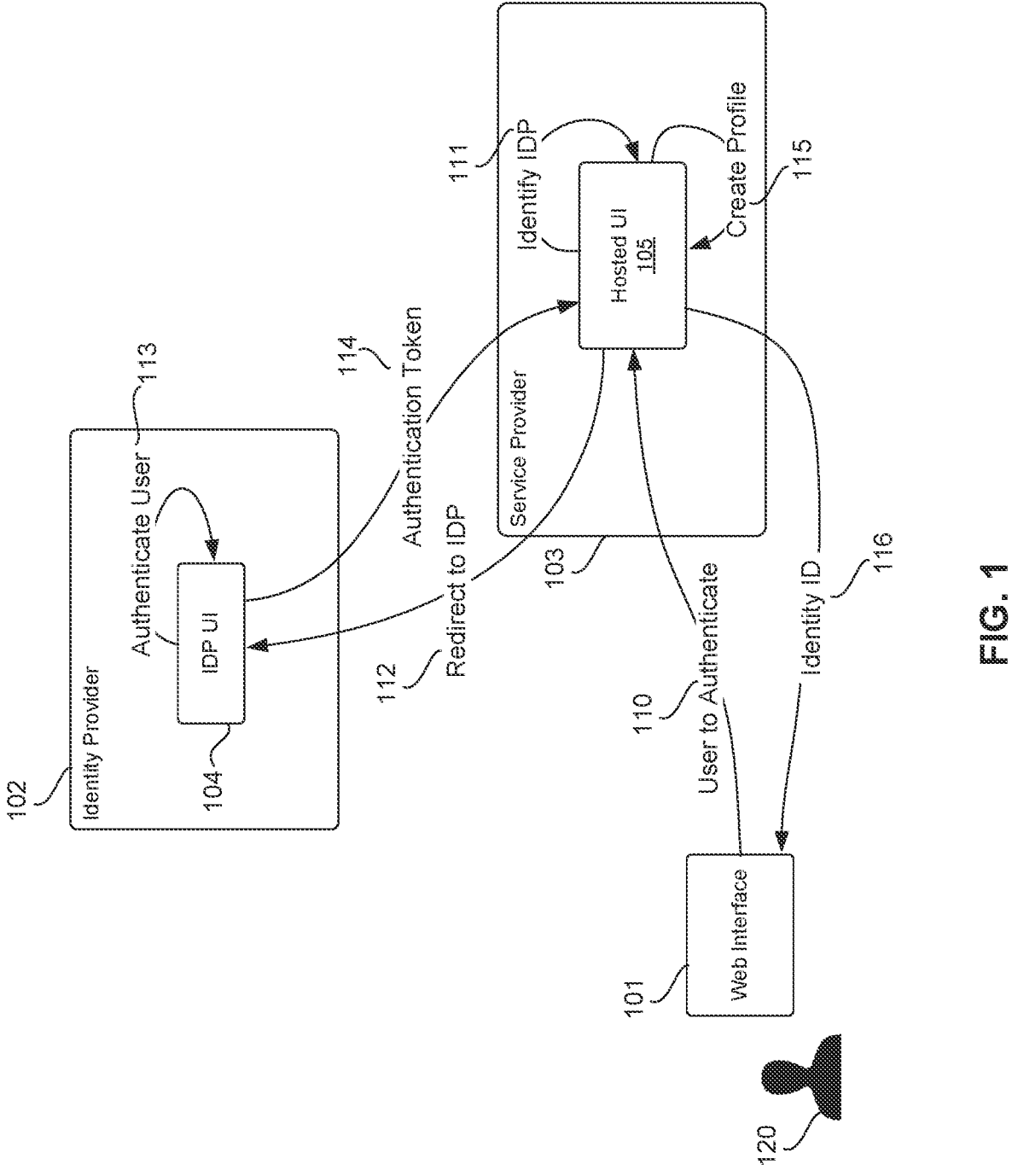
FIG. 1 is a block diagram illustrating authentication through an identity provider according to some embodiments disclosed herein.

FIG. 1 is a block diagram illustrating authentication through an identity provider according to some embodiments disclosed herein.

The system illustrated in FIG. 1 includes a web interface 101, an identity provider 102, and a service provider 103. The identity provider 102 may include an identity provider user interface (IDP UI) 104, which can manage interactions between the service provider 103 and the identity provider 102. The service provider 103 may include a hosted user interface (hosted UI) 105, which can manage interactions between the service provider 103 and the user 120 through the web interface 101.

Some steps of non-limiting example authentication process steps are shown by labeled arrows and reference numbers 110-116. The web interface 101 may be configured to receive a user's authentication request. The user 120 may use the web interface 101 to request authentication with the service provider 103 at authentication process step 110. According to some embodiments, the service provider 103 may be configured to use information received from the user in authentication process step 110 to identify an appropriate identity provider at authentication process step 111. The hosted UI 105 may be configured to perform the identifying of the appropriate identity provider. According to some embodiments, the hosted UI 105 may be configured to access a data store to retrieve internal configuration information that defines a login address and a client ID associated with the user's preferred identity provider. The login address and client ID may be associated with a login context. The login context may be a universal resource locator (URL) through which the user requested authentication at authentication process step 110. The login address may identify a network address of the identity provider 102, and the client ID may be an identifier associated with an entity or organization to which the user belongs.

The service provider 103 may be configured to redirect the user's authentication request to the identity provider 102, at authentication process step 112, once the appropriate identity provider has been identified. According to some embodiments, the URL through which the user requests authentication, at authentication process step 110, is associated with the login address and client ID of the identity provider 102 in the internal configuration information of the Hosted UI 105. The redirecting, at authentication process step 112, of the user's authentication request may comprise sending the user's authentication request and the client ID to the login address of the identity provider 102.

The identity provider 102 may be configured to authenticate the user 120, at authentication process step 113, and return an authentication token to the service provider 103 at authentication process step 114. According to some embodiments, the service provider 103 may be configured to create a profile for the user at authentication process step 115. The service provider 103 may be configured to include, in the profile, the authentication token, a user identifier, and resources to which the user is granted access. The service provider 103 may be configured to store the profile in a data store of the service provider 103.

According to some embodiments, the service provider 103 may be configured to use the authentication token and an internal secret to create a custom identifier. The custom identifier may be referred to as an identity ID. The internal secret comprises information not included in the authentication token and therefore, not vulnerable to interception in transit between the identity provider 102 and the service provider 103. The internal secret may be data that is unique to the entity or organization to which the user belongs. According to some embodiments, the internal secret may comprise data stored in the internal configuration information of the service provider. At 116, the identity ID may be sent to the web interface 101.

Figure 2:
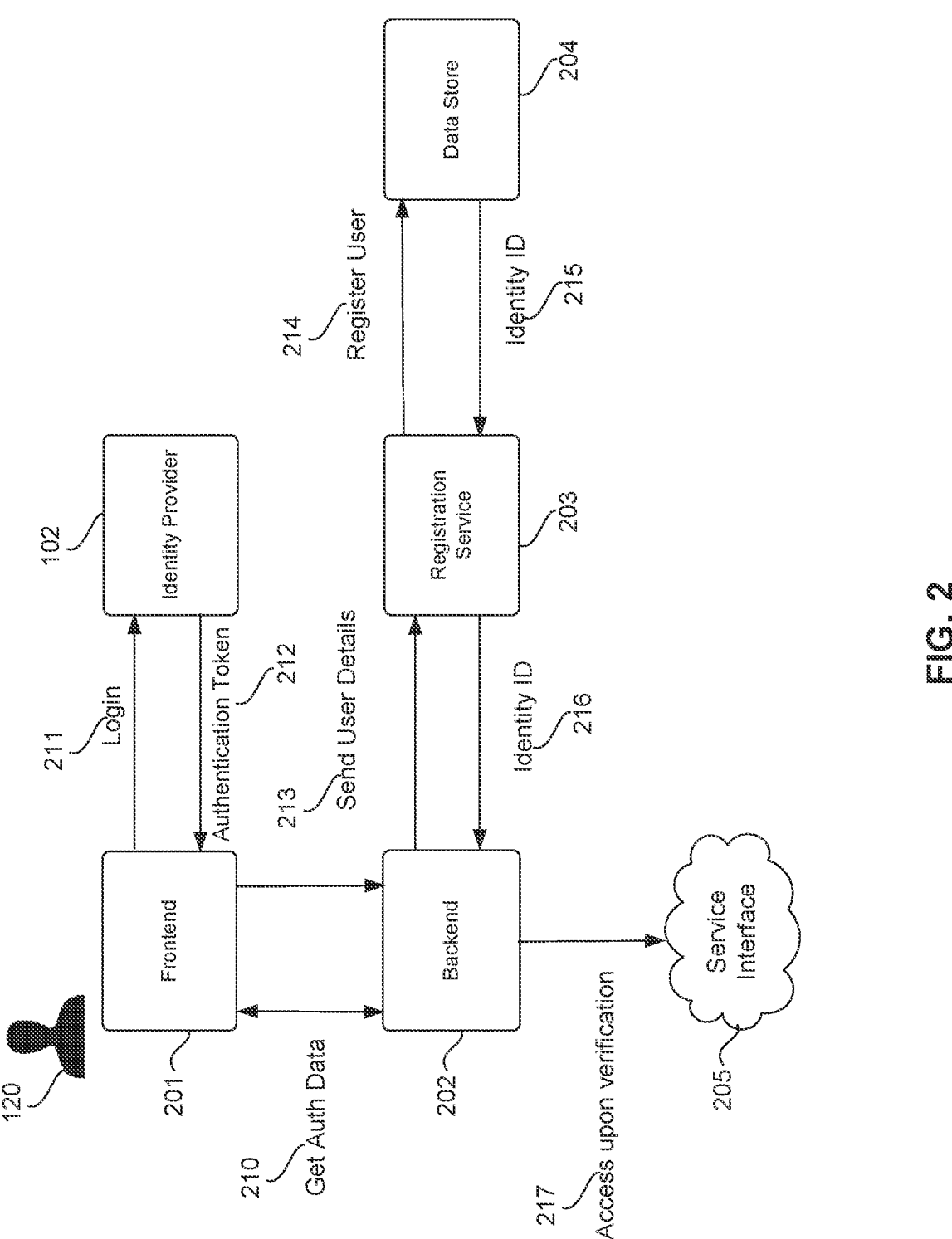
FIG. 2 is a block diagram illustrating authentication through an identity provider according to some embodiments disclosed herein.

FIG. 2 is a block diagram illustrating authentication through an identity provider according to some embodiments disclosed herein.

FIG. 2 illustrates additional details of how the service provider may generate an identity ID using the authentication token. Similar to FIG. 1, some of the authentication process steps are illustrated by arrows 210-217. A frontend 201 may be configured to receive login information from a user 120 and may be communicatively connected to the identity provider 102, and a backend 202.

The backend may be in communication with a registration service 203, a data store 204, and a service interface 205. The service interface 205 provides a user interface to a registered user including a set of services, applications, or data that the user is authorized to access. The frontend 201 may be configured to send authentication data corresponding to the user 120 to the backend 202, at authentication process step 210. According to some embodiments, the backend 202 may be configured to access a data store 204 to retrieve internal configuration information that defines a login address and a client ID associated with the identity provider 102. The login address may identify a network address of the identity provider 102, and the client ID may be an identifier associated with an entity or organization to which the user belongs. Different entities may have different identity providers, different client IDs, and different login addresses. The data store 204 may be configured to store internal configuration information for each entity using the service provider's services. The login address and client ID may be associated with a login context. The login context may be the URL through which the user accessed the frontend 201.

The frontend 201 may be configured to communicate with the identity provider 102 to send a login request, including the client ID, to the login address at authentication process step 211. The frontend 201 of the service provider may be configured to receive an authentication token from the identity provider at authentication process step 212. An authentication token may include claims that encode various details of the authentication token. Claims may include header claims and payload claims. Header claims may identify the token type, the algorithm used to sign the token, and the signature generated from an encryption key used to sign the token. The encryption key may be a public key of a public key infrastructure (PKI) key pair. According to some embodiments, the payload claims may include any of the following:

aud: The audience claim identifies the intended recipient of the token. The audience may be the service provider's application identifier. The application identifier may be assigned to the service provider's application by the identity provider 102.

iss: The issuer claim identifies the principle that issued the authentication token. The principle that issued the authentication token may be the identity provider.

iat: The "issued at" claim indicates when the authentication for the token occurred.

nbf: The "not before" claim identifies a time before which the token should not be accepted for processing.

exp: The expiration claim indicates the expiration time on or after which the token should not be accepted for processing.

name: The name claim may provide a human-readable value that identifies the subject of the token. The value may not be guaranteed to be unique, may be mutable, and may be designed to be used for display purposes.

nonce: The nonce claim should match a corresponding parameter included in the authentication request sent to the identity provider 102.

oid: The object identifier claim may be an immutable identifier for a user account at the identity provider.

preferred_username: The preferred username claim is the primary username that represents the user. It could be an email address, phone number, or a generic username without a specified format.

sub: The subject claim may refer to the principal for which the authentication token asserts information, such as the user of the service provided by the service provider. This value may be immutable and/or unable to be reassigned or reused. The subject may be a pairwise identifier, unique to a particular application identifier. If a single user signs into two different applications or services using two different client IDs, those applications or services may receive two different values for the subject claim. This may or may not be wanted depending on architecture and privacy requirements.

tid: The tenant ID claim may be a unique identifier that represents the identity provider's tenant. The identity provider's tenant may be the entity to which the user belongs.

ver: The version claim may indicate the version of the authentication token.

sid: The SID is a unique value used to identify an account.

According to some embodiments, the authentication token includes an identity provider identifier, a user identifier, and an entity identifier. The identity provider identifier may comprise the issuer claim. The user identifier may comprise one or more of the name claim, the object identifier claim, the preferred username claim, or the subject claim. The entity identifier may comprise the tenant ID claim.

The service provider may be further configured to receive user details from the identity provider 102 in addition to the authentication data. The user details comprise additional information that may be used in identifying the user's corresponding data in the internal configuration information. User details may comprise one or more of an account, an account identifier, an active indicator, an environment identifier, a home account identifier, an ID token, one or more ID token claims, a name, a raw ID token, an sid, a user ID or a username. The environment identifier may allow separation of users for a test environment or a production environment. Different entities may choose to implement different sets of user details for identifying users in internal configuration information.

The frontend 201 may be configured to send the user details, and the authentication token to the backend 202, and at authentication process step 213, the backend may be configured to send the user details and authentication token to the registration service 203.

The registration service 203 may be configured to verify that the user identified in the authentication token is associated with the entity corresponding to the login address and the client ID in the internal configuration data. The verifying may include comparing one or more of the name, oid, preferred_username or tid claims to corresponding information in the internal configuration to confirm that the user is associated with the entity.

The registration service may be configured to register the user at authentication process step 214 once the user is verified. Registering the user may comprise generating a custom ID, such as an identity ID, at authentication process step 215, and storing the identity ID and one or more of the user details in the data store 204. Generating an identity ID may comprise performing a hash on the authentication token and one or more data elements not found in the authentication token. According to some embodiments, the identity ID is generated by performing a hash on the authentication token, the account from the user details, and a string representation of one or more data elements of the internal configuration. According to some embodiments, the internal configuration used in generating the identity ID may include one or more of an entity identifier, an identity provider identifier, a type indicator, and a scope indicator. The entity identifier is an identifier of the entity of which the user is a member. The type indicator may be an indicator of the type of user login, for example, an operator, supervisor, or administrator. The scope indicator may indicate the scope or domain of services, applications or data to which the registered user is given access.

Registering the user may further comprise storing the authentication token in the data store 204. Registering the user may also comprise storing entitlements associated with the user in the data store 204. Entitlements may comprise one or more resource identifiers corresponding to resources that the user has access to with the service provider. Entitlements for each user associated with an entity may be received from the entity with other single sign-on configuration details, and different users associated with an entity may have different sets of entitlements.

The registration service 203 may be configured to return the identity ID to the backend 202 of the service provider at authentication step 216. According to some embodiments, the identity ID is used throughout the user's authenticated session. The service provider may be configured to use the identity ID, at authentication process step 217, to verify that the user has been granted access to certain resources provided through the service interface 205. According to some embodiments, the identity ID may be deconstructed to recover the authentication token, and user details and/or internal configuration information used in generating the identity ID. The authentication token and user details may be used to retrieve entitlements associated with the user in the data store. The service provider may provide the user access to resources in the service interface 205 based on the entitlements associated with the user in the data store.

FIG. 3 is a flow chart illustrating a method of authentication through an identity provider according to some embodiments disclosed herein.

At step 301, the service provider may receive single sign-on (SSO) configuration details from a first entity. According to some embodiments, the single sign-on configuration details may comprise a login address and a client ID. SSO configuration details may further comprise entitlements for each user associated with the first entity.

At step 302, the service provider may associate a login context with the SSO configuration details. The login context may be a login URL which users associated with the first entity may use for logging in to the service provider. Each entity may have a unique login URL. The login URL may be associated with the login address and client ID in the internal configuration information of the service provider.

At step 303, the service provider may receive an authentication request from a user associated with the first entity. The authentication request may be received through the login context. The service provider may redirect the user to an identity provider based on the login address and client ID from the SSO configuration details associated with the first entity, at step 304.

At step 305, the service provider may receive an authentication token and user details from the identity provider.

At step 306, according to some embodiments, the service provider may validate the authentication token against the internal configuration information. The internal configuration information may be stored in the data store 204. According to some embodiments, validating the authentication token may comprise verifying that a user and entity identified in the authentication token are associated with each other in the internal configuration information of the service provider.

At step 307, the service provider may create an identity ID. According to some embodiments, the identity ID may be created based on a hash of the authentication token and one or more data elements not found in the authentication token. According to some embodiments, the identity ID is generated by performing a hash on the authentication token, the account from the user details, and a string representation of one or more data elements of the internal configuration information. According to some embodiments, the internal configuration information used in generating the identity ID may include one or more of an entity identifier of the first entity, a provider identifier, a type indicator, and a scope indicator.

At 308, the service provider may provide access to resources based on the identity ID. The identity ID may be associated with the first entity, and one or more resource identifiers. The service provider may access the data store to determine which resource identifiers are associated with the user and provide access to the resources corresponding to the one or more resource identifiers.

According to an example embodiment, the disclosed embodiments may be applied to a multi-lender architecture configured to provide loan applicants with automated pre-qualification and eligibility evaluation for multiple candidate lenders. The service provider 103 of disclosed embodiments may include a self-service lender portal of the multi-lender architecture. The self-service lender portal may provide lenders with a suite of tools for interacting with the multi-lender architecture. The self-service lender portal may provide lenders with functionality to securely upload and manage sensitive lender data, download and view encrypted operational data, or generate and manage encryption keys. The self-service lender portal may be configured for identity federation and integration with a lender's existing single-sign on systems using one or more of the embodiments disclosed herein.

According to this example embodiment, the frontend 201 and the backend 202 of the service provider may be components of the self-service lender portal. The first entity may be a lender, participating in the multi-lender architecture, with multiple users 120 who require access to the functionality and services provided through the self-service lender portal. The identity provider 102 may be an identity provider selected by the lender. The service interface 205 may be configured to provide access to services of the self-service lender portal, including but not limited to, functionality to securely upload and manage sensitive lender data, download and view encrypted operational data, or generate and manage encryption keys. By using the single-sign on services of the lender, the self-service lender portal can provide access to the service interface 205 for all users associated with the lender without requiring creation of a new account and without the need to store login credentials.

Integrating with a lender's existing single-sign on systems enables lenders to manage their own authentication and access control policies and eliminates the need for the multi-lender architecture to store user names and passwords for users 120 of the self-service lender portal. The single-sign on embodiments also ease the process of onboarding new lenders, which may increase the number of lenders that participate and increase competition between lenders. When a user 120 of the self-service lender portal makes a change to internal configuration information, the disclosed embodiments may track appropriate attribution of the change to the user 120 who made the change. The disclosed embodiments may ensure that unauthorized changes cannot be made and that user identities cannot be faked by simply intercepting or spoofing the authentication token provided by the identity provider. The authentication and authorization mechanisms of the self-service lender portal according to the disclosed embodiments can ensure appropriate attribution, auditing, non-repudiation capabilities are available.

Figure 4:
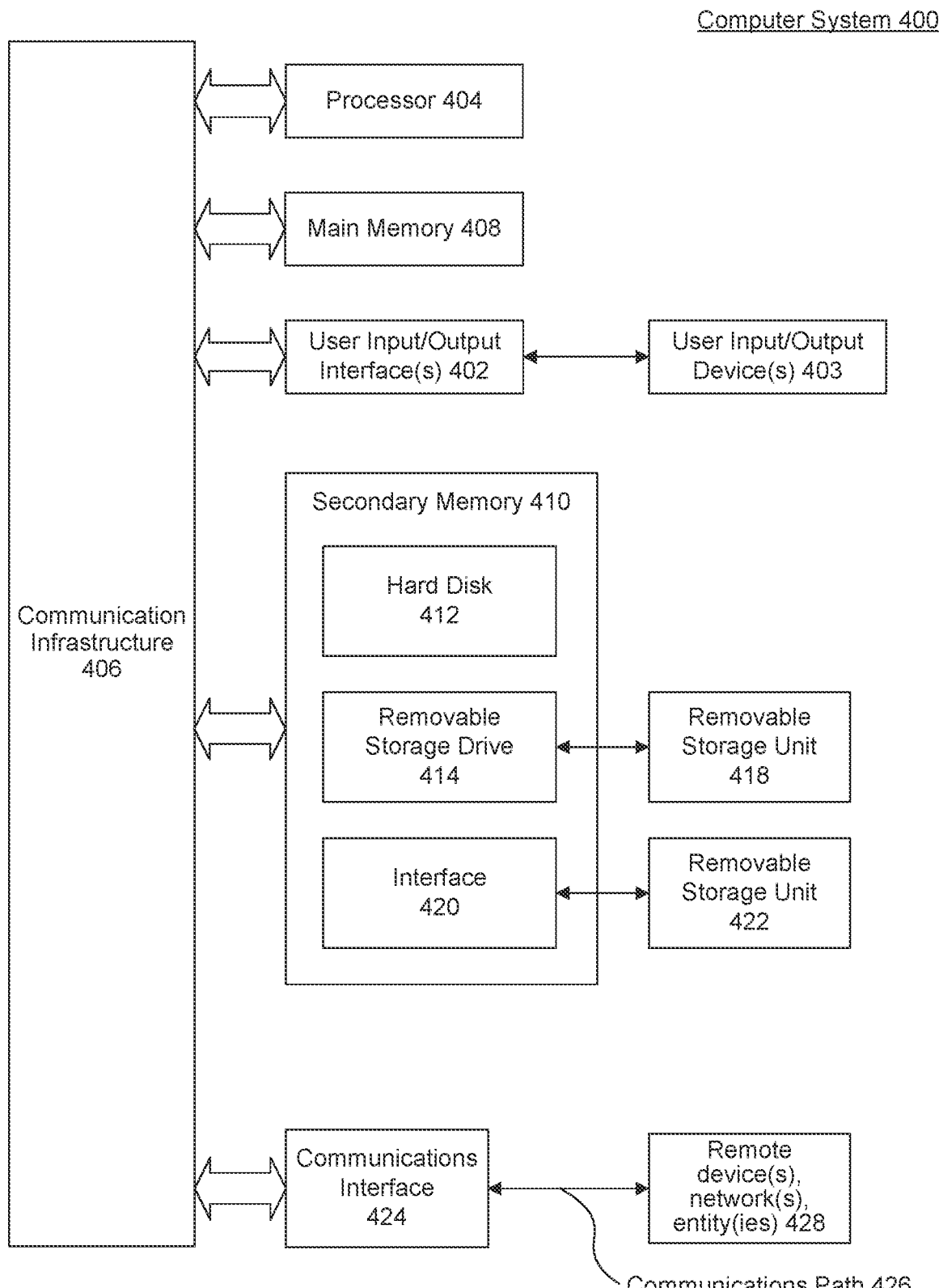
FIG. 4 is a block diagram of a non-limiting example computer system useful for implementing various embodiments disclosed herein.

FIG. 4 is a block diagram of a non-limiting example computer system useful for implementing various embodiments disclosed herein.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache and/or registers. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/or any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of authentication, the method comprising:
   sending, by a service provider, an authentication request from a user device to an identity provider that is a web service accessed by the user device, wherein the authentication request indicates the identity provider and includes a user identifier;
   validating an authentication token, received from the identity provider responsive to the authentication request, against internal configuration information of the service provider; and
   generating, by the service provider, an identity element for the user device that enables the user device to access a resource by performing a hashing operation utilizing, as inputs, the validated authentication token, the user identifier, and the internal configuration information, wherein the internal configuration information used in the hashing includes an entity identifier of an entity, and wherein the entity corresponds to an organization of users.

2. The method of claim 1, wherein the validating the authentication token comprises verifying that at least one of the user identifier or user credentials received from the user device is associated with the entity identifier mapped to the user device.

3. The method of claim 1, wherein the sending the authentication request is responsive to:

receiving at least one of user credentials or the user identifier based on an attempt by the user device to access the resource; and associating at least one of the user credentials or the user identifier with a login context for the resource.

4. The method of claim 1, further comprising enabling, based on the identity element, the user device to access the resource.

5. The method of claim 4, wherein the enabling the user device to access the resource comprises:

identifying, based on the identity element, authorization information that indicates the resource; and granting, based on the authorization information indicating the resource, the access to the resource.

6. The method of claim 1, wherein the authentication request indicates the identity provider based at least in part on single sign-on configuration information associated with the user device.

7. A system, comprising:

a memory; and a processor coupled to the memory, the processor configured to perform operations comprising:

sending, by a service provider, an authentication request from a user device to an identity provider that is a web service accessed by the user device, wherein the authentication request indicates the identity provider and includes a user identifier;

validating an authentication token, received from the identity provider responsive to the authentication request, against internal configuration information of the service provider; and generating, by the service provider, an identity element for the user device that enables the user device to access a resource by performing a hashing operation utilizing, as inputs, the validated authentication token, the user identifier, and the internal configuration information, wherein the internal configuration information used in the hashing includes an entity identifier of an entity, and wherein the entity corresponds to an organization of users.

8. The system of claim 7, wherein the validating the authentication token comprises verifying that at least one of the user identifier or user credentials received from the user device is associated with the entity identifier mapped to the user device.

9. The system of claim 7, wherein the sending the authentication request is responsive to: user identifier based on an attempt by the user device to access the resource; and associating at least one of the user credentials or the user identifier with a login context for the resource.

10. The system of claim 7, the operations further comprising enabling, based on the identity element, the user device to access the resource.

11. The system of claim 10, wherein the enabling the user device to access the resource comprises:

identifying, based on the identity element, authorization information that indicates the resource; and granting, based on the authorization information indicating the resource, the access to the resource.

12. The system of claim 7, wherein the authentication request indicates the identity provider based at least in part on single sign-on configuration information associated with the user device.

13. A non-transitory computer-readable medium storing instructions that, when executed by one or more processors of a device, cause the one or more processors to perform operations comprising:

sending, by a service provider, an authentication request from a user device to an identity provider that is a web service accessed by the user device, wherein the authentication request indicates the identity provider and includes a user identifier;

validating an authentication token, received from the identity provider responsive to the authentication request, against internal configuration information of the service provider; and generating, by the service provider, an identity element for the user device that enables the user device to access a resource by performing a hashing operation utilizing, as inputs, the validated authentication token, the user identifier, and the internal configuration information, wherein the internal configuration information used in the hashing includes an entity identifier of an entity, and wherein the entity corresponds to an organization of users.

14. The non-transitory computer-readable medium of claim 13, wherein the validating the authentication token comprises verifying that at least one of the user identifier or user credentials received from the user device is associated with the entity identifier mapped to the user device.

15. The non-transitory computer-readable medium of claim 13, wherein the sending the authentication request is responsive to:

receiving at least one of user credentials or the user identifier based on an attempt by the user device to access the resource; and associating at least one of the user credentials or the user identifier with a login context for the resource.

16. The non-transitory computer-readable medium of claim 13, further comprising enabling, based on the identity element, the user device to access the resource.

17. The non-transitory computer-readable medium of claim 16, wherein the enabling the user device to access the resource comprises:

identifying, based on the identity element, authorization information that indicates the resource; and granting, based on the authorization information indicating the resource, the access to the resource.

18. The non-transitory computer-readable medium of claim 13, wherein the authentication request indicates the identity provider based at least in part on single sign-on configuration information associated with the user device.

\* \* \* \* \*